Figure 1:
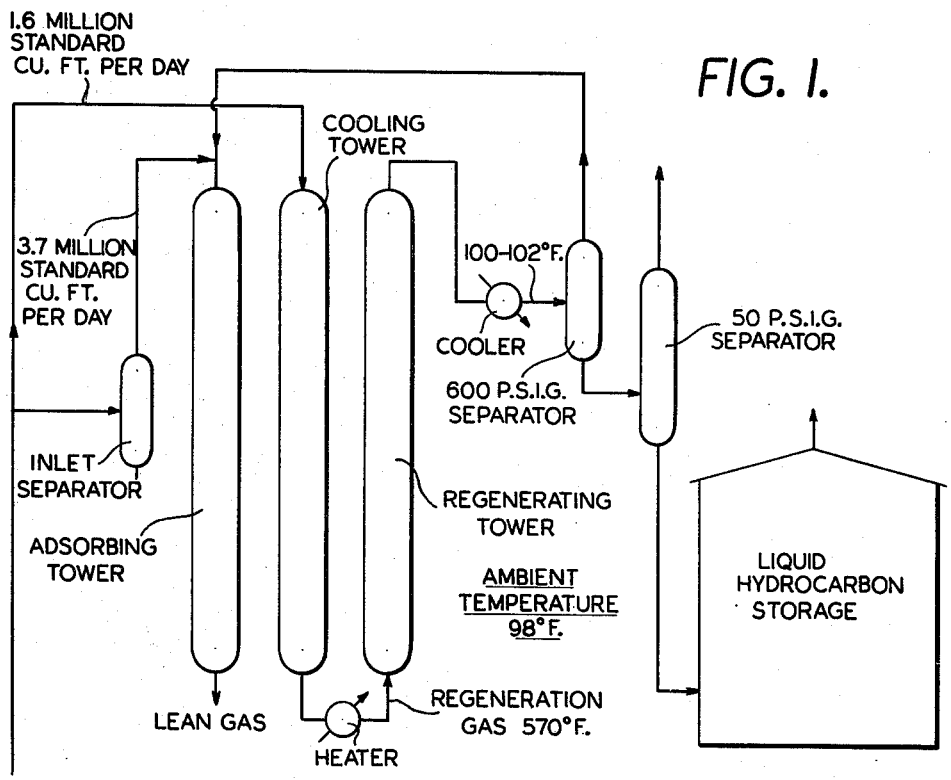

Dec. 15, 1964   F. G. DWYER ETAL   3,161,489
ADSORPTION PROCESS FOR TREATING NATURAL GAS
Filed March 8, 1961

INVENTORS
SYLVANDER C. EASTWOOD
ALBERT B. SCHWARTZ
FRANCIS G. DWYER
LUTHER J. REID, JR.
BY
Raymond W. Barclay
ATTORNEY.

United States Patent Office 3,161,489
Patented Dec. 15, 1964

3,161,489
ADSORPTION PROCESS FOR TREATING
NATURAL GAS
Francis G. Dwyer, Abington, Pa., Sylvander C. Eastwood, Woodbury, and Luther J. Reid, Jr., West Deptford Township, Gloucester County, N.J., and Albert B. Schwartz, Philadelphia, Pa., assignors to Socony Mobil Oil Company, Inc., a corporation of New York
Filed Mar. 8, 1961, Ser. No. 94,349
11 Claims. (Cl. 55—35)

This invention relates to a novel adsorption process. More particularly, this invention relates to an adsorption process for the efficient removal of water vapor and/or the recovery of hydrocarbons from a stream containing these components, this process comprising passing the stream through a solid porous inorganic-oxide adsorbent having an average pore diameter of not greater than 40 angstrom units and a volume porosity of from about 46 to 58 percent. This process finds particular application for the removal of water vapor and hydrocarbons from a natural gas stream containing the same.

The use of solid porous adsorbent materials such as activated alumina, silica gel and the like for the dehydration of natural gas is well known. However, heretofore the adsorbents used for such an application generally have had porosities ranging up to a maximum of about 45 percent of the particle volume. That is, 45 percent of the particle volume is open volume capable of holding condensed sorbate therein. The remaining 55 percent of the particle volume is made up of solid material. We have found that when dealing with such systems the adsorption capacity can be further increased by increasing the percent pore volume beyond 45 percent and decreasing the percent solid structural material in the adsorbent. This can be achieved by reducing the density of the adsorbent.

Theoretically, when a microporous adsorbent is in equilibrium with a gaseous sorbate saturated atmosphere the entire pore volume within the adsorbent is filled with condensed liquid sorbate. Further, if the pores within the adsorbent are sufficiently small, that is, have a sufficiently small average pore diameter, the pore volume can be completely filled with sorbate even though the relative saturation of the sorbate in the vapor phase is less than 100 percent. In general, the smaller the pore size, the lower the percent relative saturation of sorbate at which the pore volume still will be filled with liquid sorbate.

It will therefore be seen that in the removal of sorbate from a sorbate-rich gas stream it is desirable to use an adsorbent having pores that are sufficiently small such that they can be filled to an appreciable extent with condensed sorbate at the existing relative saturation of sorbate in the gaseous stream, but at the same time the volume of the pores should be sufficiently great to provide a maximum working volume for holding the condensed liquid. As would be expected, usually high pore volume is accompanied by large pore diameters.

During the past few years a number of commercial adsorption units have been developed to both dehydrate and recover hydrocarbons from natural gas. These units have very short adsorption cycles, of the order of 45 minutes or less. During such a short cycle much more of the liquid hydrocarbons are generally recovered as compared to the amount of water adsorbed. In contrast, the earlier units used for adsorption operated on cycles of several hours so that the amount of hydrocarbons recovered was comparatively low because of the preferential adsorption for large volumes of water that was exhibited by the adsorbent over this long cycle.

Accordingly, it is an object of our invention to provide an improved process for the removal of sorbate from a sorbate-rich stream by contacting said stream with an adsorbent having optimum capacities for effective sorbate removal.

A further object is to provide an improved process for sorbate separation, i.e., dehydration and recovery of hydrocarbons from natural gas, wherein said sorbate is initially present in said natural gas in comparatively high percent relative saturation.

Another object is to provide an improved and economical process for the separation of water and hydrocarbons from natural gas whereby relatively less adsorbent is needed (on a weight basis) to effect such separation than has heretofore been required.

Additional objects will become apparent hereinafter.

Figure 2:
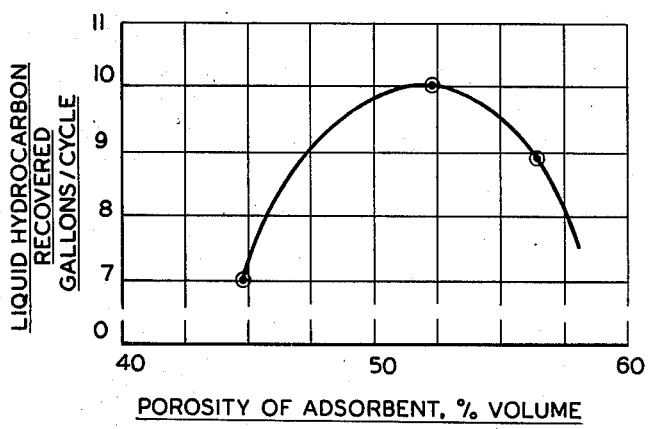

Our invention will be more fully understood by reference to accompanying drawing wherein:

FIG. 1 is a schematic diagram showing one embodiment of the process of our invention and illustrates a three tower adsorbent system, and FIG. 2 is a graph showing the amount of liquid hydrocarbons recovered from a natural gas stream using silica-alumina adsorbents of varying porosities.

In any commercial adsorbing operation it is desirable to realize the highest adsorption capacity on a volume basis. The degree of high equilibrium volumetric capacities that can be realized using low density adsorbents is illustrated in Table 1. For purposes of comparison, the theoretical maximum capacity that can be achieved, assuming the total pore volume is filled with sorbate, is also tabulated in the table. It will be noted that the experimental capacities obtained for air at 80 percent relative saturation and the theoretical maximum capacities for each density (equivalent to adsorption capacity in water saturated air) are in substantial agreement, which indicates that at 80 percent relative saturation the entire pore volume of the adsorbent is filled with water. With the exception of adsorbent number 6, which adsorbent is the lowest density adsorbent and correspondingly has the highest porosity, a decrease in density (and increase in porosity) results in a higher volumetric adsorption capacity. However, when the density of the adsorbent was reduced to 0.81 gram per cubic centimeter (adsorbent 6) the adsorption capacity actually dropped. This would indicate that the pores were not sufficiently small to become filled with condensed sorbate in the presence of air at 80 percent relative saturation. Of course, had the air been at 100 percent relative saturation, adsorbent number 6 would then have exhibited the highest volumetric adsorption capacity.

TABLE 1

*Equilibrium Adsorption Capacities of 97% Silica–3% Alumina Adsorbent*

| Adsorbent No. | Density of Adsorbent | | Porosity, Percent Volume | Theoretical Maximum Adsorption Capacity,[2] lbs./cu. ft. | Experimentally Measured Adsorption Capacity [3] |
|---|---|---|---|---|---|
| | Particle Density g./cc. | Estimated Packed Density,[1] lbs./cu. ft. | | | Pounds of water vapor adsorbed from 80 percent relative humidity air per cubic foot of desiccant |
| 1 | 1.22 | 49 | 45.6 | 18.2 | 18.3 |
| 2 | 1.17 | 47 | 47.8 | 19.2 | 19.3 |
| 3 | 1.01 | 40 | 54.9 | 21.6 | 21.5 |
| 4 | 0.92 | 37 | 59.0 | 23.7 | 22.6 |
| 5 | 0.89 | 35 | 59.4 | 23.5 | 23.5 |
| 6 | 0.81 | 32 | 63.7 | 25.3 | 17.6 |

[1] Packed density=0.64×particle density.
[2] Calculated assuming skeletal density 2.2 g./cc.
[3] Test MIL-D-3716 (Military Specification D-3716, approved by the Department of Defense).

In this application porosity is expressed as percent volume of pores per volume of particle. This makes it unnecessary to correct for different skeletal densities and for variations in void space due to shape of particles when comparing different adsorbents. Accordingly, porosity refers to the micropore structure only, and not to large pores introduced by pelleting or extruding. "Particle density" is computed on the basis of the entire particle volume, that is, the volume occupied by the adsorbent material plus the volume of the internal micropores. It is to be distinguished from "real" or "skeletal" density which is computed solely on the basis of the volume occupied by the adsorbent material per se and excludes the volume of micropores therewithin.

Although low density, high porosity adsorbents exhibit the highest equilibrium capacity in 100 percent relative humidity air, they also exhibit lower capacites at lower percent relative saturations. For example, considering the dehydration of a gas, at some point in the adsorbent bed the humidity of the gas passing therethrough will be lowered, let us say, to 60 percent. The remaining portion of the adsorbent will therefore exert a lower capacity for drying this gas.

Considering the applicability of our invention to the dehydration of natural gas and to the recovery of hydrocarbons therefrom, it will be noted that natural gas consists mainly of methane, with lower concentrations of ethane, propane, butane, pentane, hexane, and perhaps some heavier hydrocarbons. Some carbon dioxide, nitrogen, and water are also usually present. In most cases the natural gas is saturated or very nearly saturated with heavier hydrocarbons. The hydrocarbons generally recovered in an adsorption unit are propane and heavier.

In accordance with one aspect of our invention, we have found that for effective removal of sorbate from a sorbate-rich gas stream by means of a solid porous inorganic-oxide adsorbent, there exists both an optimum porosity range and an optimum average pore diameter range for said adsorbent whereby the most efficient sorbate removal can be effected. Thus, we have found that unusually effective separation of hydrocarbons and/or water from natural gas is obtained when such sorbate-rich natural gas is brought into contact with a solid inorganic-oxide adsorbent having a porosity from about 46 to 58 volume percent and an average pore diameter of from about 15 up to a maximum of 40 angstroms.

The average pore diameter is determined on the assumption that the pores of the adsorbent are essentially cylindrical. Accordingly, the average diameter of the pores of a given adsorbent are related to the pore volume and surface area by the equation:

$$d = \frac{4V}{A}$$

where V is the volume of the pores, A is the surface area, and $d$ is the diameter. This equation makes use of the total pore volume and the surface area of the adsorbent.

We have found the porosity range to be of extreme significance, for if the porosity of the adsorbent exceeds about 58 percent by volume then the average pore diameter becomes too large, that is, in excess of 40 angstroms, and such large pores are unable to effectively adsorb the sorbate when it exists in concentrations less than 100 percent. On the other hand, if the porosity of the adsorbent falls below above 46 percent by volume then the overall volumetric adsorption capacity of the adsorbent drops considerably and the process is no longer efficient. Accordingly, the use of a siliceous adsorbent having a porosity of between about 46 and 58 percent by volume, and having an average pore diameter of from about 15 to 40 angstroms, results in an unusually effective process for sorbate separation.

Our invention finds particular applicability when the sorbate, i.e., water and/or propane and heavier hydrocarbons, initially present in the natural gas stream exists in rather high percent relative saturation. That is, our process is particularly effective when the initial concentration of water in the natural gas stream is at least 40 percent of its saturation, or when the initial concentration of at least one of the hydrocarbon components of propane and heavier hydrocarbons in the natural gas stream is at least 40 percent of its saturation concentration. Given such initially high relative saturation of sorbate, the method of our invention results in a substantial decrease in relative saturation of sorbate in the ultimate gas stream effluent, say to 25 percent or less.

As previously stated, natural gas consists chiefly of methane, along with lower concentrations of heavier hydrocarbons. Those hydrocarbons generally recovered in the adsorption unit are propane and heavier. The following examples illustrate such hydrocarbon recovery. All parts are by weight unless otherwise indicated.

EXAMPLES 1–3

In these examples each run was made by passing a stream consisting of 32 volume percent methane and 68 volume percent pentane through the adsorbent bed. The total volume of adsorbent used was held constant for each run. The adsorption column consisted of a six foot aluminum tube having an internal diameter of 1 and 3/64 inches. The tests were carried out at atmospheric pressure and 80° F. The gaseous flow rate was 0.19 standard cubic foot [1] per minute. The length of the adsorption cycle was 20 minutes. Three runs were made wherein the gas was passed through adsorbents of silica-alumina (97.7% silica, 2.3% alumina). A fourth run was made using a silica gel adsorbent. After each run the adsorbent was weighed to determine the quantity of normal pentane adsorbed. The results of these runs are tabulated in Table 2. It will be noted that the use of a silica-alumina adsorbent having a porosity and average pore diameter falling within the specified ranges (Example 1) resulted in a distinctly greater adsorption pentane than that obtained from either of the other silica-alumina adsorbents (Examples 2 and 3) or from the silica gel adsorbent (Example 4), all of which had a porosity outside of the specified 46 to 58 percent (although having an average pore diameter falling within the range of from about 15 to 40 angstroms).

TABLE 2

*Adsorption of Pentane From Methane-Pentane Stream Using Silica-Alumina Bead Adsorbent (97.7% Silica, 2.3% Alumina) and 100% Silica Gel Adsorbent*

| Example and Run Number | Adsorbent Designation | Quantity of Adsorbent Used, Grams | Average Pore Diameter, A. | Porosity, Percent Volume | Pentane Adsorbed, g. |
|---|---|---|---|---|---|
| 1 | a A | 740.4 | 22.3 | 47.8 | 146.2 |
| 2 | b B | 788.0 | 22.0 | 44.8 | 141.1 |
| 3 | c C | 545.8 | 39.6 | 59.4 | 128.9 |
| 4 | d D | 702.0 | 21.7 | 43.8 | 127.0 | a Silica-alumina; particle density=1.170 g./cc.; real density=2.24 g./cc.; pore volume=0.409 cc./g.; surface area=732 sq. meters/g.
b Silica-alumina; particle density=1.235 g./cc.; real density=2.24 g./cc.; pore volume=0.362 cc./g.; surface area=658 sq. meters/g.
c Silica-alumina; particle density=0.890 g./cc.; real density=2.24 g./cc.; pore volume=0.667 cc./g.; surface area=673 sq. meters/g.
d 100% silica gel, granular; particle density=1.19 g./cc.; real density 2.13 g./cc.; pore volume=0.368 cc./g.; surface area=678 sq. meters/g.

The following examples illustrate our adsorption process as carried out on a commercial scale. It will be understood that commercial dehydration and hydrocarbon recovery units generally operate at from about 300 to 2000 pounds per square inch gage, and from about 20° to 175° F. The velocity of the incoming gas is generally from about 0.05 to 10 feet per second, based on total cross sectional area of the adsorbent bed.

---

[1] Occupying a volume of 1 cubic foot at 60° F. and at atmospheric pressure.

EXAMPLES 4–6

Three towers were used, one on adsorption, one on cooling, and one on regenerating, as schematically illustrated in FIG. 1. Each tower was 9 feet high and had a 20.5 inch internal diameter. The inlet feed gas [2] was fed at a rate of 5.3 million standard cubic feet per day, at a pressure of 670 pounds per square inch gage, and at a temperature of 84° F. The volume of adsorbent placed in each tower was 22.1 cubic feet. The length of a cycle was 14 minutes. The feed rate for the regeneration gas was 1.6 million standard cubic feet per day, and this regeneration gas was fed at a temperature of 570° F. The ambient temperature was 98° F. The recoveries obtained are tabulated in Table 3 and are plotted in graphical form in FIG. 2. It will be noted that adsorbent B of Example 4 exhibited a porosity of only 44.8 percent, or below the specified minimum of 46 percent, whereas adsorbents D and E (Examples 5 and 6) exhibited porosities of 52.4 and 56.4 percent, respectively, i.e., within the specified range of from about 46 to 58 percent. As expected, the quantity of hydrocarbons and water recovered was noticeably less when using adsorbent B than when using either adsorbents D or E. The optimum porostiy was about 52.4 percent, resulting in the highest hydrocarbon recovery, namely, 10.0 gallons. Further, the plotted data shows that optimum results were achieved when the volume porosity of the adsorbent was from about 46 to 58 percent.

TABLE 3
*Three Tower Unit*

| Example and Run Number | Adsorbent Designation | Quantity of Adsorbent Used in Tower, Pounds | Average Pore Diameter, Angstroms | Adsorbent Porosity, percent volume | Quantity of Hydrocarbon and Water Recovered per cycle in 50 p.s.i.g. separator, gallons | |
|---|---|---|---|---|---|---|
| | | | | | Hydrocarbon | Water |
| 4 | a B | 1,065 | 22.0 | 44.8 | 7.0 | 0.3 |
| 5 | b E | 983 | 28.1 | 52.4 | 10.0 | 0.6 |
| 6 | c F | 893 | 31.3 | 56.4 | 8.9 | 0.7 | a Same as Adsorbent B, Table 2.
b 97.7% silica, 2.3% alumina; particle density=1.061 g./cc.; real density=2.24 g./cc.; pore volume=0.494cc./g.; surface area=704 sq. meter/g.
c 97.7% silica, 2.3% alumina; particle density=0.975 g./cc.; real density=2.24 g./cc.; pore volume=0.578 cc./g.; surface area=740 sq. meter/g.

The three tower adsorbent system shown in FIG. 1 is, of course, conventional, with the complete cycle therefor involving three successive steps, adsorption, regeneration, and cooling. In practice, one tower is on adsorption, a second is being regenerated, and the third is being cooled. The steps occurring in each tower are rotated in turn so that the tower on adsorption is subsequently regenerated, then cooled to complete the cycle, and then again returned to adsorption, etc. The method of our invention also lends itself to other conventional adsorbent systems, e.g., to two tower systems and to single tower systems. In the former, one tower is on adsorption while the second is being regenerated and cooled. In the one tower system (for a batch process), after the adsorption step it is necessary to have a shutdown period of sufficient duration to permit regeneration and cooling.

It is important to note that the optimum porosity for the adsorbent will depend to some degree on the particular conditions of operation of the adsorption unit as well as on its design. Accordingly, it is not possible to further limit the porosity range beyond the previously stated range of from about 46 to 58 volume percent. Further, the adsorbent average pore diameter should not exceed 40 angstroms, and preferably should be from about 15 to 40 angstroms.

It will be understood that the particular chemical composition of the inorganic oxide used as the adsorbent material in the method of our invention is immaterial, so long as the adsorbent exhibits the requisite physical characteristics, namely, a porosity of from about 46 to 58 percent by volume and an average pore diameter of from about 15 to 40 angstroms. The inorganic oxide may be made in the form of a true hydrogel, a gelatinous precipitate, or the like. Suitable inorganic-oxide adsorbent materials include such siliceous materials as silica, silica-alumina, silica-magnesia, silica-zirconia, silica-thoria, silica-titania, silica-iron oxide, etc., and such non-siliceous metal oxides as alumina, etc. Naturally occurring clays and chemically modified clays may also be used.

The particular means for making an adsorbent having a porosity of from about 46 to 58 percent volume and average pore diameter of from about 15 to 40 angstroms are well known and are not critical. Generally, the percent pore volume within an adsorbent particle is controlled and varied by suitable varying the particle density. This is achieved by well-known methods. For example, when silica-gel type materials are used a silica hydrogel formed by gelation of a silica sol at a pH of about 6.5 or higher can be "aged." This aging will result in a lowering of the gel density. A typical method of preparing hydrogels and controlling their density, porosity, etc., is described in U.S. Patent 2,698,305.

Variations can of course be made without departing from the spirit of our invention.

Having thus described our invention, what we desire to secure and claim by Letters Patent is:

1. An improved method for the separation of water, propane and heavier hydrocarbons from a natural gas stream, this method comprising passing said stream through a zone containing a solid porous inorganic-oxide adsorbent having a porosity of from about 46 to 58 percent by volume and an average pore diameter of from about 15 to 40 angstrom units.

2. The method of claim 1 carried out at a temperature of from about 20° to 175° F. and a pressure of from about 300 to 2000 pounds per square inch gage, the velocity of said stream through said adsorbent being from about 0.05 to 10 feet per second based on the total cross-sectional area of said zone.

3. The method of claim 2 wherein the initial concentration of water in said natural gas stream is at least 40 percent of its saturation concentration and wherein the passage of said stream through said adsorbent is continued for a time sufficient that the percent relative saturation of water in the effluent gas stream is substantially less than the said initial concentration.

4. The method of claim 2 wherein the initial concentration of at least one hydrocarbon component of propane and heavier hydrocarbons in said natural gas stream is at least 40 percent of its saturation concentration and wherein the passage of said stream through said adsorbent is continued for a time sufficient that the percent relative saturation of said hydrocarbon component in the effluent gas stream total is substantially less than the said initial concentration.

5. An improved method for the separation of water, propane, and heavier hydrocarbons from a natural gas stream, this method comprising passing said stream through a zone containing a solid porous siliceous adsorbent having a porosity of from about 46 to 58 percent volume and an average pore diameter of from about 15 to 40 angstrom units.

---

[2] Analyzed as follows:

| Analysis: | Mole percent |
|---|---|
| Carbon dioxide | 2.83 |
| Nitrogen | 0.13 |
| Methane | 86.63 |
| Ethane | 6.22 |
| Propane | 2.43 |
| Isobutane | 0.45 |
| n-Butane | 0.54 |
| Isopentane | 0.20 |
| n-Pentane | 0.14 |
| Hexanes+ | 0.43 |
| Total | 100.00 |

6. The method of claim 5 carried out at a temperature of from about 20° to 175° F. and a pressure of from about 300 to 2000 pounds per square inch gage, the velocity of said stream through said adsorbent being from about 0.05 to 10 feet per second based on the total cross-sectional area of said zone.

7. The method of claim 6 wherein the initial concentration of water in said natural gas stream is at least 40 percent of its saturation concentration and wherein the passage of said stream through said adsorbent is continued for a time sufficient that the percent relative saturation of water in the effluent gas stream is substantially less than the said initial concentration.

8. The method of claim 6 wherein the initial concentration of at least one hydrocarbon component of propane and heavier hydrocarbons in said natural gas stream is at least 40 percent of its saturation concentration and wherein the passage of said stream through said adsorbent is continued for a time sufficient that the percent relative saturation of said hydrocarbon component in the effluent gas stream total is substantially less than the said initial concentration.

9. An improved method for the separation of water, propane, and heavier hydrocarbons from a natural gas stream, this method comprising passing said stream at a temperature of from about 20° to 175° F. and a pressure of from about 300 to 2000 pounds per square inch gage through a zone containing a solid porous gel comprising a major proportion of silica and a minor proportion of alumina, the velocity of said stream being from about 0.05 to 10 feet per second based on the total cross-sectional area of said zone.

10. The method of claim 9 wherein the initial concentration of water in said natural gas stream is at least 40 percent of its saturation concentration and wherein the passage of said stream through said adsorbent is continued for a time sufficient that the percent relative saturation of water in the effluent gas stream is substantially less than the said initial concentration.

11. The method of claim 9 wherein the initial concentration of at least one hydrocarbon component of propane and heavier hydrocarbons in said natural gas stream is at least 40 percent of its saturation concentration and wherein the passage of said stream through said adsorbent is continued for a time sufficient that the percent relative saturation of said hydrocarbon component in the effluent gas stream total is substantially less than the said initial concentration.

References Cited in the file of this patent

UNITED STATES PATENTS

| | | |
|---|---|---|
| 2,093,454 | Kistler | Sept. 21, 1937 |
| 2,698,305 | Plank et al. | Dec. 28, 1954 |
| 2,746,934 | Richardson et al. | May 22, 1956 |
| 2,823,764 | Miller | Feb. 18, 1958 |
| 2,910,139 | Matyear | Oct. 27, 1959 |
| 2,988,521 | Innes et al. | June 13, 1961 |